(12) United States Patent
Aoki

(10) Patent No.: US 6,559,981 B1
(45) Date of Patent: May 6, 2003

(54) IMAGE READING APPARATUS

(75) Inventor: Takeshi Aoki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/502,039

(22) Filed: Feb. 11, 2000

(30) Foreign Application Priority Data

| Feb. 15, 1999 | (JP) | ........................................ 11-036223 |
| Dec. 17, 1999 | (JP) | ........................................ 11-358736 |

(51) Int. Cl.$^7$ .............................................. H04W 1/40
(52) U.S. Cl. ...................................... 358/505; 358/474
(58) Field of Search ................................. 358/474, 443, 358/448, 461, 482, 486, 505, 514, 515

(56) References Cited

U.S. PATENT DOCUMENTS

| 4,712,137 A | | 12/1987 | Kadekodi et al. ............ 358/213 |
| 5,343,233 A | * | 8/1994 | Abe ............................ 346/157 |
| 5,434,649 A | * | 7/1995 | Hasuo ......................... 555/201 |
| 5,475,508 A | | 12/1995 | Maeshima et al. ........... 358/514 |
| 5,513,018 A | * | 4/1996 | Katsha ........................ 358/474 |
| 6,016,184 A | * | 1/2000 | Haneda ........................ 355/56 |

FOREIGN PATENT DOCUMENTS

| EP | 0 070 620 A2 | 1/1983 | ............ H04L/29/14 |
| EP | 0 504 641 A2 | 9/1992 | ............ H04N/3/15 |
| EP | 0 808 057 A2 | 11/1997 | ........... H04N/1/409 |
| JP | A-58-19081 | 2/1983 | ............. H04N/5/30 |
| JP | A 62-122376 | 3/1987 | |
| JP | A-7-107276 | 4/1995 | ............. H04N/1/40 |

* cited by examiner

Primary Examiner—Jerome Grant, II
Assistant Examiner—Negussie Worku
(74) Attorney, Agent, or Firm—Oliff & Berridge, PLC

(57) ABSTRACT

During processing in an image reading apparatus, if the this-time pixel data Kn+1 is larger than the level value M, the value averaged by the averaging circuit 31 is not adopted, but an arrival value is adopted as it is. In the case where the this-time pixel data Kn+1 is not larger than the level value M, if the pixel data in which a differential value |Kn−Kn+1| of the last time pixel data Kn and the this-time pixel data Kn+1, calculated in the differential unit 32, is larger than the setting value L, arrives, an arrival value is adopted as it is, and if the pixel data in which a differential value |Kn−Kn+1| of the last time pixel data Kn and the this-time pixel data Kn+1, calculated in the differential unit 32, is not larger than the setting value L, arrives, the output of the averaging circuit 31 is adopted.

14 Claims, 6 Drawing Sheets

IMAGE READING APPARATUS

BACKGROUND OF THE INVENTION

The present invention relates to an image reading apparatus provided with a color image pick-up system.

An image reading apparatus reads an image of a document, typically by moving a carriage having a color image pick-up system in parallel with the document surface. The pick-up system is equipped with a line sensor, made, for instance, of three kinds of CCDs for reading three primary colors, each being constituted by a large number of linearly arrayed image pick-up elements.

In the case of a flat bed type image reading apparatus, a document bed formed of a transparent plate such as glass is provided on the upper surface of a box type casing to place the document thereon. A carriage inside the casing is moved in parallel with the document bed by the action of a driving device. A light source and a color image pick-up system are installed on this carriage. The irradiation light of the light source is reflected by the document surface on the bed, and converged onto the color image pick-up system by a condenser lens.

In order to increase resolution of an image read in the main scanning direction, i.e. a direction in which the image pick-up elements are arrayed in a CCD, the image reading apparatus is required to have the increased number of image pick-up elements constituting the CCD. This, however, increases the size of the CCD as well as the cost associated with optical design therefor, if the number of the pick-up elements is simply increased without changing the size of the individual element. Further, making the pick-up element smaller in size has a limitation of manufacture.

As an attempt to meet the above requirement, JP-A-58-19081 discloses a CCD image sensor in which optical detectors are arranged in first and second rows with the second row optical detector being shifted by about half width of the individual optical detecting element relative to the first row optical detector. In this CCD image sensor, the first low optical detector and the second row optical detector are arranged adjacent to each other in the sub-scanning direction.

The CCD image sensor having such plural rows of optical detectors as disclosed makes it possible to realize twice reading resolution in the main scanning direction in comparison to a CCD image sensor having a single row of an optical detector as the same line on a document can be read by both of the first row optical detector and the second row optical detector.

A problem associated with the CCD image sensor having the plural rows of optical detectors reading the same line on the document is a level difference that may occur between adjacent pixel outputs (the output of the odd numbered pixel and the output of the even numbered pixel) on a line due to the difference of characteristics between the first and second row optical detectors, and the difference of characteristics between respective shift registers to which electric charges are transferred from optical detectors. This level difference, typically when the image signal is processed at the high resolution not lower than a 128-level gray scale, results in longitudinal stripes on a read-out image, greatly degrading image quality.

Since the longitudinal stripes conspicuously appear on pixel data in a dark portion rather than on pixel data in a bright portion, the longitudinal strips give a serious problem particularly to the pixel data in the dark portion. Herein, the pixel data in the dark portion mean, for example, in the case of 256-level gray scale as shown in FIG. 6, the pixel data of the level not higher than about an output level 20 in a reflection-type document and a transmission-type document positive film, or the pixel data of the level not lower than about an output level 230 in a transmission-type document negative film. That is, the pixel data in the dark portion have a value indicative of a level darker than a predetermined level. Further, the pixel data in the bright portion mean the pixel data of the level not lower than about the output level 20 in the reflection-type document and the transmission-type document positive film, or the pixel data of the level not higher than about the output level 230 in the transmission-type document negative film. That is, the pixel data in the bright portion have a value indicative of a level brighter than a predetermined level.

SUMMARY OF THE INVENTION

A primary object of the present invention is to provide an image reading apparatus which can effectively correct a level difference between adjacent pixel outputs (odd numbered pixel output and even numbered pixel output) on each one line.

Another object of the present invention is to provide an image reading apparatus which can increase the resolution in the main scanning direction, and which can read an image with the low resolution in the sub-scanning direction at high speed.

In an image reading apparatus according to a first aspect of the present invention, a color image pick-up system has image pick-up element groups. In each of the groups, a plurality of image pick-up element rows are arranged in parallel one another on a substrate. In each of the image pick-up element rows, a plurality of image pick-up elements are linearly arranged. The image pick-up element rows in the same group are shifted one from another by an amount smaller than the width of one image pick-up element in the direction in which the image pick-up elements are linearly arrayed. A first comparison circuit generates a signal to select the this-time pixel data when the differential value of the this-time pixel data and the last time pixel data for each one line is larger than a predetermined setting value. When the differential value is not larger than a predetermined setting value, the first comparison circuit generates a signal to select the output data of the averaging circuit. The first comparation circuit sends either of the signals to the selection circuit. Further, the second comparison circuit generates a signal to select the this-time pixel data, when the this-time pixel data have a value indicative of a level brighter as an image than a predetermined level. The second comparison circuit generates a signal to select the output signal of the first comparison circuit when the this-time pixel data have a value indicative of a level darker than a predetermined level. The second comparison circuit sends either of the signals to these election circuit. Accordingly, for the image data in the bright portion, the this-time pixel data is selected. For the pixel data in the dark portion, the output signal of the first comparison circuit is selected. Therefore, only for the pixel data in the dark portion, the level difference between the odd numbered pixel output and the even numbered pixel output for each one line is dissolved. Consequently, the level difference between the odd numbered pixel output and the even numbered pixel output for each one line can be effectively dissolved.

In an image reading apparatus according to a second aspect of the present invention, the first comparison circuit has a first set section to set a predetermined setting value, a differential unit to calculate the differential value of the this-time pixel data and the last time pixel data for each one line, and a first comparator to compare the differential value calculated by the differential unit with the setting value set by the set section. Further, the second comparison circuit has a second set section to set a predetermined level value, and a second comparator to compare the this-time pixel data with the level value set by the second set section. Accordingly, the level difference between the odd numbered pixel output and the even numbered pixel output for each one line can be appropriately and surely dissolved. Consequently, a problem that edges, or the like, of the image are blurred, can be prevented.

In an image reading apparatus according to a third aspect of the present invention, the shading correction circuit conducts the shading correction of the pixel output data of the A/D converter. Accordingly, the level difference caused between the odd numbered pixel output and the even numbered pixel output after the shading correction has been conducted, can be dissolved.

In an image reading apparatus according to a fourth aspect of the present invention, the color image pick-up system has the image pick-up element rows which are arranged at the pitch of integer times, not smaller than two times, of the height of the image pick-up element in the direction vertical to the arrayed direction of the image pick-up elements. Accordingly, when the color image pick-up system is relatively moved to the document in the sub-scanning direction, which is perpendicular to the main-scanning direction, at integer times of the speed, all of the image pick-up element rows read the same line on the document. Consequently, the high speed reading in the low resolution can be achieved.

In an image reading apparatus according to a fifth aspect of the present invention, since the image pick-up element groups correspond respectively to red, green and blue, the light from the document can be read while being separated into three primary colors.

In an image reading apparatus according to a sixth aspect of the present invention, because, in each the image pick-up element group, the first and the second element rows are shifted from each other by almost a half pitch of the width of the image pick-up element, the resolution of reading in the main-scanning direction can be twice.

In an image reading apparatus according to a seventh aspect of the present invention, because the image pick-up element group has an opening portion not larger than the light receiving area of the image pick-up element and a shield portion to shield the light from reaching onto the peripheral portion of the image pick-up element, the range which is read in an overlapped manner by a plurality of image pick-up elements on the document, can be reduced. Consequently, the resolution of reading can be increased substantively.

The present disclosure relates to the subject matter contained in Japanese patent application Nos. Hei. 11-36223 (filed on Feb. 15, 1999) and Hei. 11-358736 (filed on Dec. 17, 1999), which are expressly incorporated herein by reference in their entireties.

BRIEF DESCRIPTION OF THE DRAWINGS

FIG. 5A is a plan view and FIG. 5B is a sectional view.

DESCRIPTION OF THE PREFERRED EMBODIMENT

Preferred embodiments of the present invention will be described with reference to the accompanying drawings.
First Embodiment The first embodiment in which the invention is applied to a carriage moving type, flat bed image reading apparatus, is shown in FIG. 1 to FIG. 4.

Figure 2:
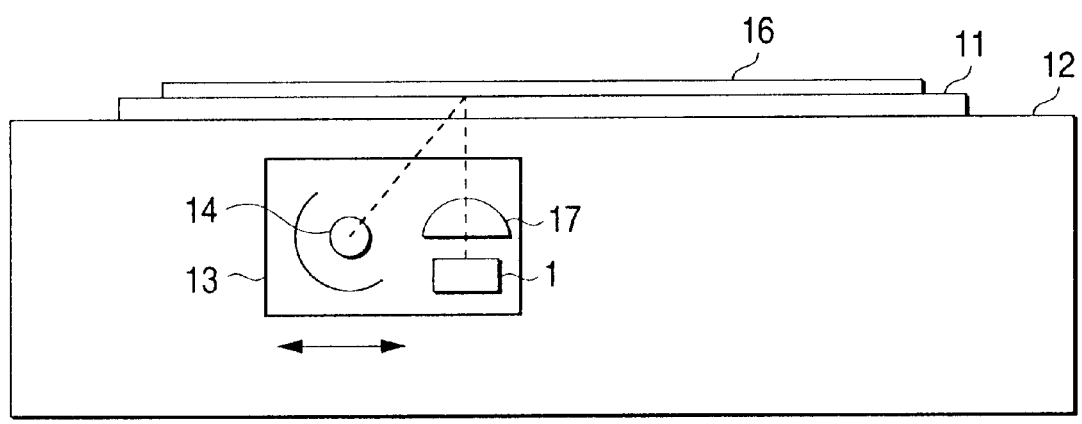
FIG. 2 is a typical view showing the image reading apparatus according to the first embodiment of the present invention.

As shown in FIG. 2, a transparent document bed 11 such as a glass plate is provided on the upper surface of a casing 12. A carriage 13 inside the casing 12 is adapted to be moved in parallel with the document bed 11 by the action of a not-shown driving device. A light source 14 and a line sensor (a color image pick-up system) 1 are installed on the carriage 13. The irradiated light from the light source 14 is reflected by the surface of a document 16 placed on the document bed 11, and after being reflected by a plurality of not-shown mirrors, the light is converged by a condenser lens 17 onto the color image pick-up system 1 serving as an image sensor. The color image pick-up system 1 converts the lights of red (R: Red), green (G: Green), and blue (B: Blue) respectively into electric signals to output the signals therefrom.

Figure 3:
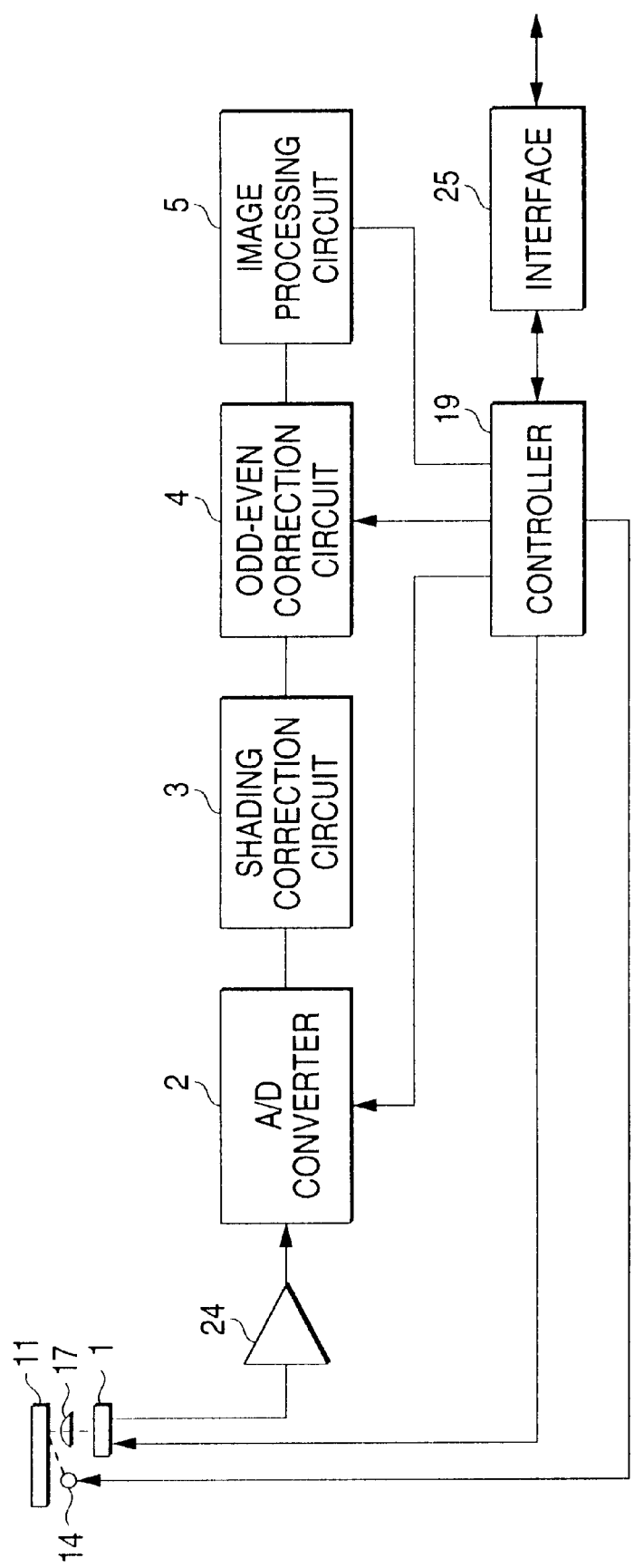
FIG. 3 is a block diagram showing a functional structure of the image reading apparatus according to the first embodiment of the present invention.

FIG. 3 is a block diagram functionally showing a structure of the image reading apparatus described above.

In FIG. 3, a control device 19 is typically constructed by a microcomputer having CPU, RAM, ROM, etc., and is connected to or communicated with an external image processing apparatus, such as a personal computer, through an interface 25. By a command signal from the image processing apparatus, the control device 19 controls the electric charge accumulation time of the color image pick-up system 1, and selects a gamma function used for the gamma correction, which will be described later.

An A/D converter 2 converts light intensity signals, which are inputted from the color image pick-up system 1 through an amplifier 24, into digital signals, and transfers the digital signals to a shading correction circuit 3. The shading correction circuit 3 corrects the signal corresponding particularly to both end portions in the main-scanning.

The pixel data, which have been shading-corrected by the shading correction circuit 3, are subjected to correction by an odd-even correction circuit 4. That is, the odd-even correction circuit 4 corrects a level difference occurring between outputs of the odd-numbered pixel and the even-numbered pixel located on the same line (i.e., outputs of adjacent pixels on each line). In the first embodiment, the pixel data, which have been shading-corrected by the-shading correction circuit 3, are subjected to the odd-even correction. Therefore, it is possible to prevent the shifting of the odd-even corrected pixel data, which otherwise may occur in case where the odd-even corrected pixel data are subjected to the shading-correction.

The pixel data thus odd-even corrected by the odd-even correction circuit 4 are subjected to image processing such as the gamma correction, color correction, enlargement/reduction, etc. by an image processing circuit 5.

Figure 4:
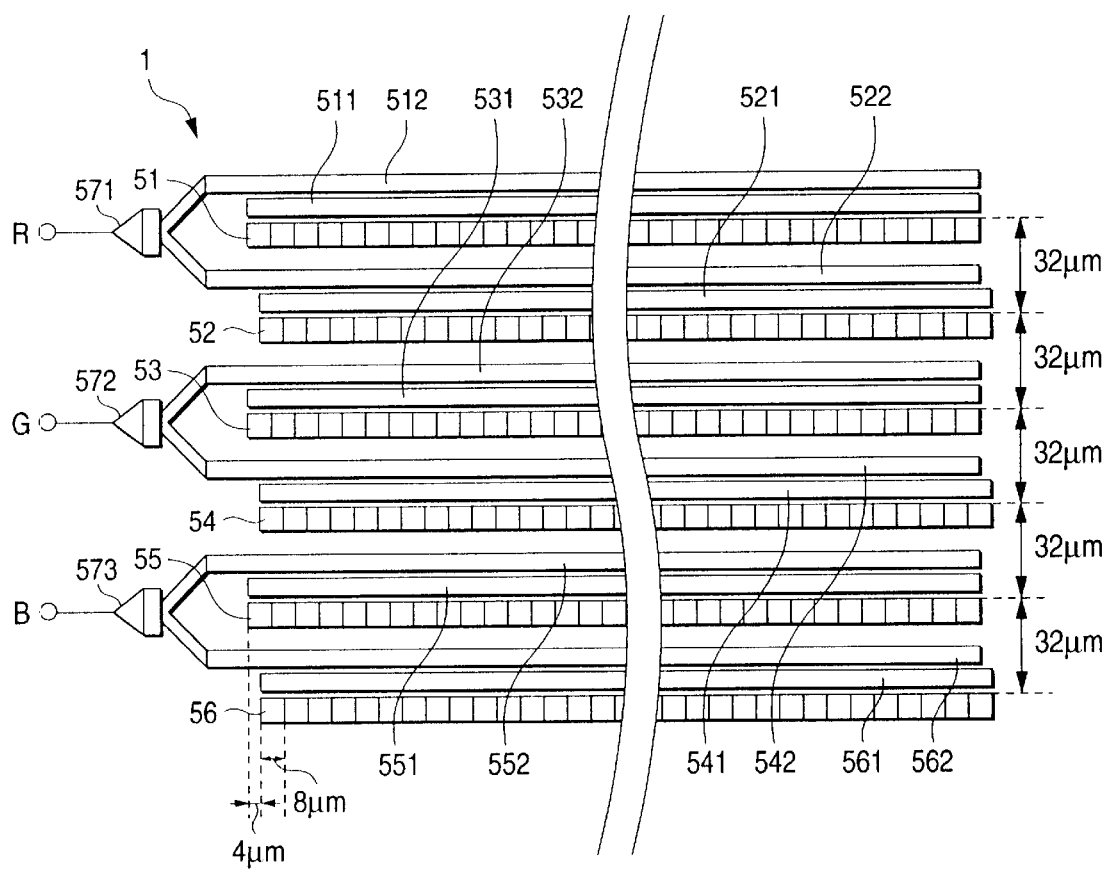
FIG. 4 is a typical view showing a color image pick-up system of the image reading apparatus according to the first embodiment of the present invention.

As shown in FIG. 4, the color image pick-up system 1 has image pick-up element groups to read respective lights of R, G, and B. Each of the image pick-up element groups includes plural rows of image pick-up elements. In this embodiment, as shown, two rows of image pick-up elements are provided for each image pick-up element group, one being a first element row, i.e. a first photoelectric conversion element row 51, 53, 55 and the other being a second element row, i.e. a second photoelectric conversion element rows 52, 54, 56. Each of the row 51, 52, 53, 54, 55, 56 is constructed by a plurality of image pick-up elements, such as photoelectric conversion elements, linearly arrayed in a direction perpendicularly to the movement direction of the carriage 13 shown in FIG. 2. In the first embodiment, each image pick-up element is a regular square of 8 $\mu$m×8 $\mu$m, and therefore the width of each photoelectric conversion element row is 8 $\mu$m. In each image pick-up element group, the first photoelectric conversion element row 51, 53, 55 and the second photoelectric conversion element row 52, 54, 56 are shifted in the main-scanning direction relative to each other by an amount of 4 $\mu$m that is a half of the width of the image pick-up element.

In each image pick-up element group, the first photoelectric conversion element row 51, 53, 55 and the second photoelectric conversion element row 52, 54, 56 are arranged by the pitch of 32 $\mu$m which is four times of the height of the image pick-up element, that is, four times of the width of photoelectric conversion element row. Further, adjacent rows in adjacent different groups are arranged at the pitch of 32 $\mu$m which is four times of the width of photoelectric conversion element row. That is, the second photoelectric conversion element row 52 of the image pick-up element group to read R and the first photoelectric conversion element row 53 of the image pick-up element group to read G are arranged by the pitch which is four times as large as the width of photoelectric conversion element row, and the second photoelectric conversion element row 54 of the image pick-up element group to read G and the first photoelectric conversion element row 55 of the image pick-up element group to read B are arranged by the pitch which is four times as large as the width of photoelectric conversion element row. Accordingly, six photoelectric conversion element rows 51 to 56 are arranged at equal intervals such that each pitch of the adjacent two photoelectric conversion elements is four times as large as the width of photoelectric conversion element rows.

Electric charges accumulated in each photoelectric conversion element row are transferred to a shift register 512, 522, 532, 542, 552, 562 through a transfer gate 511, 521, 531, 541, 551, 561 in synchronization with a driving signal generated at a predetermined interval. Each photoelectric conversion element row starts accumulation of electric charges caused by the light from the next reading line, whereas the electric charges transferred to each shift register are outputted, one element by one element sequentially, from an output section 571, 572, 573.

In the first embodiment, each photoelectric conversion element row is designed to read the document 16 with the resolution of 600 dpi (dot per inch) in the main-scanning direction. Accordingly, the color image pick-up system 1 can read one line with the resolution of 1200 dpi for each of R, G and B when the data read by the first photoelectric conversion element row 51, 53, 55 and the data read by the second photoelectric conversion element row 52, 54, 56 at a position to which the carriage 3 is subsequently moved by the four time of width of photoelectric conversion element row, are composed. Herein, when, for example, the image pick-up elements of the first photoelectric conversion element row 51, 53, 55 read information of the odd-numbered pixels, the image pick-up elements of the second photoelectric conversion element row 52, 54, 56 read information of the even-numbered pixels on the same line.

Figure 1:
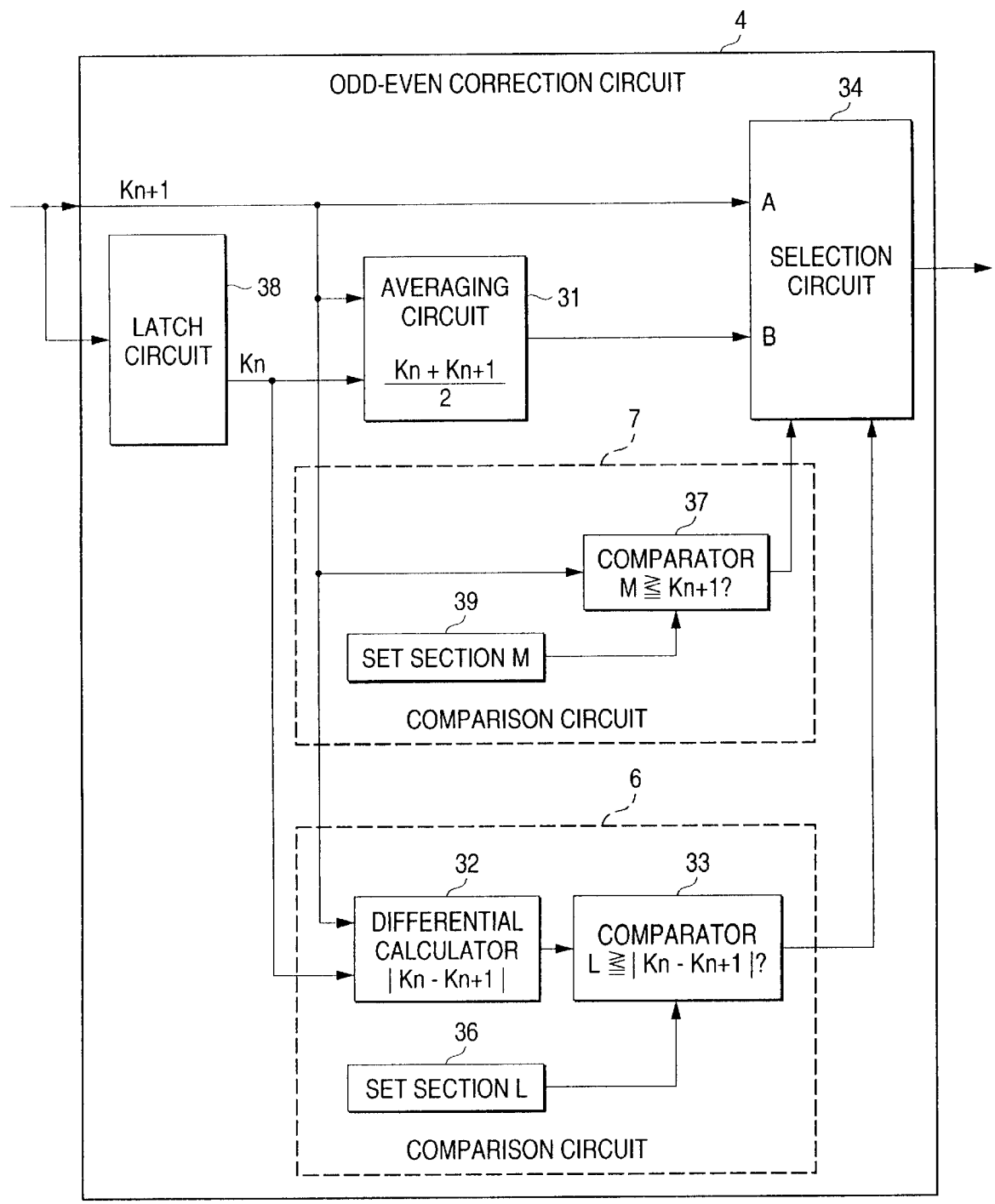
FIG. 1 is a structural view showing an odd-even correction circuit of an image reading apparatus according to the first embodiment of the present invention.

Next, the odd-even correction circuit 4 will be described in detail with reference to FIG. 1.

The odd-even correction circuit 4 includes a comparison circuit 6 as a first comparison circuit, a comparison circuit 7 as a second comparison circuit, an averaging circuit 31, a selection circuit 34 and a latch circuit 38. The comparison circuit 6 includes a differential unit 32, a comparator 33 as a first comparator, and a set section 36 as a first set section, and the comparison circuit 7 includes a comparator 37 as a second comparator, and a set section 39 as a second set section.

The latch circuit 38 supplies the last time pixel data (Kn) of one time before the this-time pixel data (Kn+1), to the averaging circuit 31 and the differential unit 32. An output of the shading correction circuit 3 (FIG. 3) is inputted into an input terminal A of the selection circuit 34. An output of the averaging circuit 31 is inputted into an input terminal B. A predetermined setting value (L) is set in the set section 36, and a predetermined level value (M) is set in the set section 39. The differential unit 32 calculates the differential value of the this-time pixel data (Kn+1) and the last time pixel data (Kn) on the same line. The comparator 33 compares the differential value calculated by the differential unit 32 with the setting value set in the set section 36, and outputs a selection signal to the selection circuit 34. The comparator 37 compares the this-time pixel data (Kn+1) with the level value set in the set section 39, and outputs a selection signal to the selection circuit 34. The averaging circuit 31 calculates the average value of the this-time pixel data (Kn+1) with the last time pixel data (Kn) on the same line, and conducts correction-processing to replace the this-time pixel data (Kn+1) with the calculated average value. If the this-time pixel data (Kn+1) is larger than the level value (M) set in the set section 39, that is, if the this-time pixel data (Kn+1) has a value indicative of a level brighter than a predetermined level, then the comparator 37 provides the selection signal to the selection circuit 37 to select the output from the shading correction circuit 3. If the this-time pixel data (Kn+1) is not larger than the level value (M) set in the set section 39, that is, if the this-time pixel data (Kn+1) has a value indicative of a level darker than a predetermined level, then the output signal of the comparison circuit 6 is adopted (the selection circuit 34 awaits the selection signal outputted from the comparison circuit 6). That is, if the differential value of the this-time pixel data (Kn+1) and the last time pixel data (Kn) is larger than the setting value (L) set in the set section 36, then the comparison circuit 6 outputs the selection signal to the selection circuit 34 to select the output from the shading correction circuit 3, and, in contrast, if the differential value of the this-time pixel data (Kn+1) and the last time pixel data (Kn) is not larger than the setting value (L) set in the set section 36, then the comparison circuit 6 outputs the selection signal to the selection circuit 34 to select the output from the averaging circuit 31.

Accordingly, when the this-time pixel data is larger than the level value in the set section 39, the selection signal is supplied to select an input terminal A of the selection circuit 34, and also when the this-time pixel data is not larger than the level value in the set section 39 but the differential value calculated by the differential unit 32 is larger than the setting value in the set section 36, the selection signal is supplied to select the input terminal A of the selection circuit 34. However, when the this-time pixel data is not larger than the level value in the set section 39 and the differential value calculated by the differential unit 32 is not larger than the setting value in the set section 36, the selection signal is supplied to select the input terminal B.

Assuming here, for convenience of explanation, that there are pixels of total number of m on one line, data for the n-th pixel among m pixels on a line are denoted by Kn, data for the (n+1)-th pixel on the same line are denoted by Kn+1, the setting value is L, and the level value is M. If the this-time pixel data Kn+1 is larger than the level value M, then the value obtained as a consequence of the average calculation by the averaging circuit 31 is not adopted, but the arrival value (the received value) is adopted as it is. Further, in the case where the this-time pixel data Kn+1 is not larger than the level value M, if the pixel data Kn+1 is received, whose differential value |Kn−Kn+1| calculated in the differential unit 32 in comparison to the last time pixel data Kn is larger than the setting value L, then the value obtained as a consequence of the average calculation by the averaging circuit 31 is not adopted, but the arrival value (the received value) is adopted as it is. However, in the case where the this-time pixel data Kn+1 is not larger than the level value M, if the pixel data is received, whose differential value |Kn−Kn+1| calculated in the differential unit 32 in comparison to the last time pixel data Kn is not larger than the setting value L, then the output of the averaging circuit 31 is adopted.

Next, operations of the image reading apparatus structured as described above, will be described.

The user connects or associates a personal computer, not shown, to an interface 25 of the image reading apparatus, places a document 16 on a document bed 11, and specifies the reading range and/or reading resolution for the document 16 through the personal computer, and commands to carry out the reading.

When carrying-out of the reading is commanded, the control device 19 turns on the light source 14, and moves the carriage 13 at a predetermined speed perpendicularly to the direction in which the image pick-up elements are arrayed as the photoelectric conversion element rows. The image on one line is read by each photoelectric conversion element row of the color image pick-up system 1 in accordance with the driving signal generated every predetermined time. The resolution of reading in the sub-scanning direction is determined based on the time period necessary for each photoelectric conversion element row to read one line, and the movement speed of the carriage 13. For example, if the carriage 13 moves by an amount corresponding to the width of one photoelectric conversion element row for every reading of one line of the document 16, the document can be read at the resolution of 600 dpi in the sub-scanning direction.

In the first embodiment, the photoelectric conversion element rows are arranged at the pitch, which is four times as large as the width of one photoelectric conversion element row, in the sub-scanning direction. If each photoelectric conversion element row has a reading capability of 600 dpi resolution, the carriage 3 can be moved at the speed of two times or four times of the case of reading at 600 dpi in order to perform of the reading at high speed in the resolution of 300 dpi or 150 dpi in the sub-scanning direction, and in this case, all of photoelectric conversion element rows 51 to 56 can read the same line. For this reason, in the case of reading the image in the high resolution in the main-scanning direction while reading the image in the low resolution in the sub-scanning direction, such reading can be conducted at the high speed.

In the first embodiment, for the image data of the bright portion, the this-time pixel data is selected, and for the image data of the dark portion, the signal of the comparison circuit 6 is referred to. Therefore, only for the image data of the dark portion, the correction is effected on the shading-corrected pixel data to eliminate the level differences between the odd-numbered and even-numbered pixel outputs. Therefore, the level differences between the outputs of the odd-numbered and even-numbered pixels on every one line can be effectively dissolved. Further, because the distinct border portion of white and black of the image is not blurred, edges of the image can be prevented from blurring.

Further, in the first embodiment, the shading-corrected pixel data are subjected to the shading-correction and thereafter to the odd-even correction by the odd-even correction circuit 4. Therefore, in contrast to the case where the pixel data are subjected to the odd-even correction and then to the shading correction, it is possible to prevent the odd-even corrected pixel data from being shifted as a consequence of the subsequent shading correction.

Figure 6:
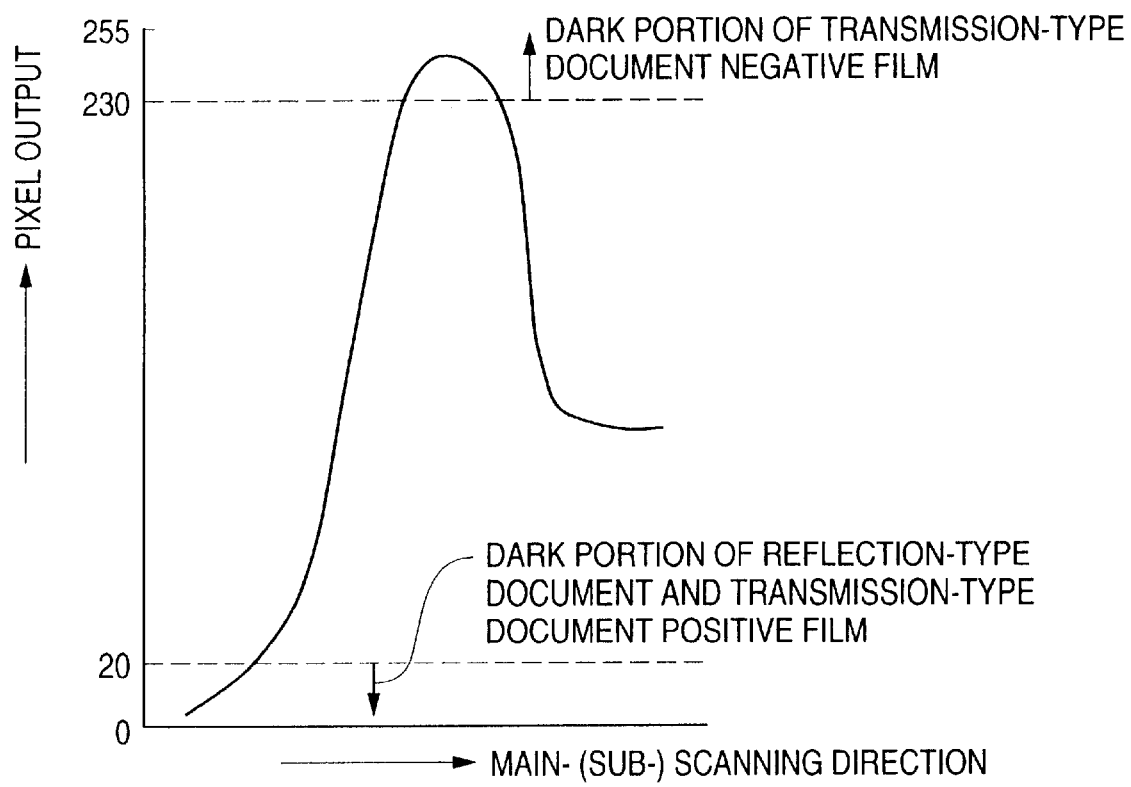
FIG. 6 is a view for explaining the pixel data in a dark portion and a bright portion, and a data view showing an example of a pixel output in the case of 256 gradations.

In the first embodiment of the present invention described above, an example to read the reflection-type document is described, and in the case of 256-level gray scale as shown in FIG. 6, M=20 can be set, and it is preferable to set L=5. The same is applied to the case where the transmission-type document positive film is read. If the transmission-type document negative film is read with 256-level gray scale as shown in FIG. 6, M=230 can be set. In this case, when the this-time pixel data Kn+1 is smaller than the level value M=230, the output from the shading correction circuit 3 is selected. When the this-time pixel data Kn+1 is not smaller than the level value M=230, the signal of the comparison circuit 6 is adopted for selection.

In the first embodiment, the odd-even correction is conducted after the shading correction is conducted, however, the present invention can also be applied to the case that the shading correction circuit to conduct shading correction after the odd-even correction is conducted, is provided. That is, the odd-even correction may be conducted prior to the shading correction.

The Second Embodiment

Figure 5:
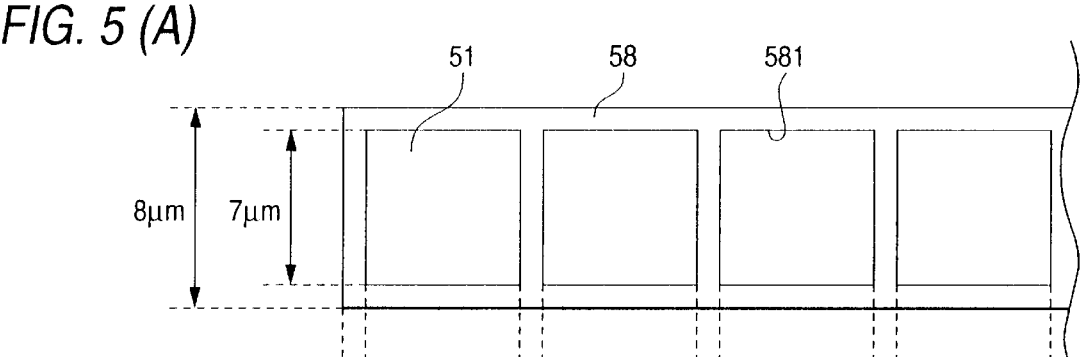
FIG. 5 is views showing image pick-up element rows of the color image pick-up system of the image reading apparatus according to the second embodiment of the present invention.
Figure 5:
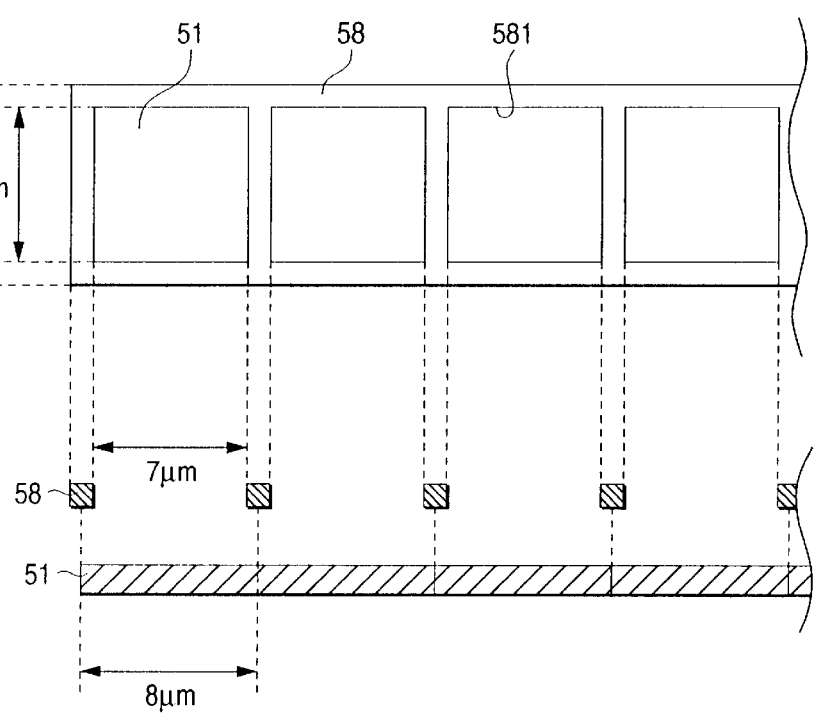

The photoelectric conversion element row employed in the color image pick-up system of the image reading apparatus according to the second embodiment of the present invention are shown in FIG. 5. FIG. 5A is a plan view and FIG. 5B is a sectional side view.

In the second embodiment, a shield portion 58 is provided for each photoelectric conversion element row. The shield portion 58 is disposed on a light receiving side of the photoelectric conversion element row, which is formed with opening portions 581 corresponding to respective photoelectric elements. Each of the opening portion 581 has an area not larger than a light receiving area of a respective photoelectric conversion element to shield the light from reaching to the peripheral portion of the element. In FIG. 5, the shield portion 58 provided for the photoelectric conversion element row 51 is shown, and the same shield portions as described above are provided for other photoelectric conversion element rows 52 to 56, respectively. The shield portion 58 is formed of ametallic plate, and each opening portion 581 is in the form of a square of 7 $\mu$m×7 $\mu$m. The other structures are the same as those described in connection with the first embodiment shown in FIG. 4.

In the second embodiment, the light is shielded by the shield portion 58 so as not to reach onto the peripheral portion of each element. This design can decrease a portion which is read duplicatedly on the document by a plurality of elements, thereby enhancing the substantive resolution. Further, because each element has higher sensitivity at the central portion than at the peripheral portion, it is possible to minimize the lowering of the sensitivity in association with the reduction of the light receiving area.

In the embodiments described above, the photoelectric conversion element rows are arranged at the pitch four times as large as the width of one row, however, the photoelectric conversion element rows can be arranged at the pitch of arbitrary integer times, not smaller than twice, as large as the width of one row. For example, in the case where each photoelectric conversion element row has a reading capability of 600 dpi resolution in the main-scanning direction, and the photoelectric conversion element rows are arranged at the pitch twice as large as the width of one row, if the carriage equipped with photoelectric conversion element rows is moved at the speed twice as high as the speed at which the reading in the sub-scanning direction is carried out with the resolution of 600 dpi, to conduct the reading with the resolution of 300 dpi at high speed, then all photoelectric conversion element rows can read the same line on the document. In the case where photoelectric conversion element rows are arranged at the pitch three times as large as the width of one row, the reading with the resolution of 200 dpi at high speed allows all photoelectric conversion element rows to read the same line. In the case where photoelectric conversion element rows are arranged at the pitch six times as large as the width of one row, the reading with the resolution of 300 dpi, 200 dpi, and 100 dpi at high speed allows all photoelectric conversion element rows to read the same line. The similar effect can be obtained when each of the photoelectric conversion element rows has a reading capability of another resolution, or the photoelectric conversion element rows are arranged at the pitch of any integer times as large as the width of one photoelectric conversion element row.

In the embodiments described above, the present invention is applied to the image pick-up apparatus in which the image pick-up element group for each of colors R, G and B is structured by two rows of the photoelectric conversion element rows, and the first photoelectric conversion element row and the second photoelectric conversion element row are arranged by being shifted by almost half pitch of the length of the image pick-up element and the resolution in the main-scanning direction is increased to about two times. The present invention can also be applied to the image pick-up apparatus in which the image pick-up element group for each color is structured by three rows, four rows or more rows of the photoelectric conversion element rows. In this case, by arranging the photoelectric conversion element rows equidistantly in the sub-scanning direction at the pitch of integer times as large as the width of one row, the reading can be conducted in the sub-scanning direction with the low resolution at high speed. For example, in the case where the image pick-up element group for each color is structured by three rows of the photoelectric conversion element rows, the first photoelectric conversion element row and the second photoelectric conversion element row are shifted each other by the pitch of about ⅓ of the length of the image pick-up element, and the second photoelectric conversion element row and the third photoelectric conversion element row are shifted each other by the pitch of about ⅓ of the length of the image pick-up element. This arrangment makes it possible to increase the resolution in the main-scanning direction about three times. Similarly, in the case where photoelectric conversion element rows are arranged in four rows, such an arrangement that those rows are shifted one another by the pitch of about ¼ of the length of the image pick-up element makes it possible to increase the resolution in the mai-scanning direction about four times.

Further, in the embodiments, the output section is provided one by one corresponding to the image pick-up element group for each of colors R, B and G. The output section may be provided one by one for each of photoelectric conversion element rows.

Further, in the embodiments, the present invention is applied to the carriage movement type, flat bed image reading apparatus, however, the present invention can be applied to the mirror movement type, flat bed image reading apparatus, in which the color image pick-up system and the condenser lens are fixed and the reflection mirror group is moved, and also can be applied to other image reading apparatuses such as the sheet feed type to read the document while moving the document.

Further, in the embodiments, the correction circuit 4 is described to have the selection circuit 34, the comparison circuits 6 and 7, etc. However, the present invention should not be restricted thereto or thereby. For example, the function of the correction circuit 4 to select either of the input data for the subject pixel as it is or corrected data for the subject pixel as well as to create the correct data for the subject pixel may be rewritten as a program to be executed by a processor or a computer. In this case, the program is preferably stored in a memory medium provided in the image reading apparatus, or installed in the memory medium from another memory medium such as a floppy disk, a CD-ROM, etc. The program is preferably executed by the controller 19 or a computer communicated with the controller 19 through the interface 25.

What is claimed is:

1. An image reading apparatus for reading an image on a document by irradiating light from a light source onto the document, receiving light reflected from the document or transmitted through the document, and converting the thus reflected or transmitted light into electric signals, said image reading apparatus comprising:

a color image pick-up system having image pick-up element groups, each of said groups having a plurality of image pick-up element rows arranged in parallel, each of said rows having a plurality of linearly arrayed image pick-up elements, the rows in the same group being shifted one from another by an amount smaller than a width of one of said image pick-up elements in a direction in which said image pick-up elements are linearly arrayed, said color image pick-up system outputting data on pixels;

an A/D converter which converts said data outputted from said color image pick-up system into digital data;

an averaging circuit which calculates and outputs average data between digital data on a this-time pixel and a last time pixel on a line;

a selection circuit to which said digital data on said this-time pixel and said average data outputted from said averaging circuit are inputted;

a first comparison circuit which generates a first signal for selecting said data on said this-time pixel if a differential value between said data on said this-time and last time pixels data is larger than a predetermined setting value, generates a second signal for selecting said average data outputted from said averaging circuit if said differential value is not larger than the predetermined setting value, and supplies either of said first and second signals to said selection circuit; and a second comparison circuit which generates a third signal for selecting said data on said this-time pixel if said data on said this-time pixel have a value indicative of a level brighter than a predetermined level, generates a fourth signal for selecting said first or second signal outputted from said first comparison circuit if said data on said this-time pixel have a value indicative of a level darker than said predetermined level, and supplies either of said third and fourth signals to said selection circuit.

2. The image reading apparatus according to claim 1, wherein the first comparison circuit includes:
   a first set section to set said predetermined setting value,
   a differential unit to calculate said differential value between said data on said this-time and last time pixels data and the last time pixel data, and
   a first comparator to compare said differential value, calculated by said differential unit, with said predetermined setting value, and
said second comparison circuit includes:
   a second set section to set said predetermined level, and
   a second comparator to compare data on said this-time pixel data with said predetermined level.

3. The image reading apparatus according to claim 1, further comprising:
   a shading correction circuit which conducts a shading correction on said digital data outputted from said A/D converter.

4. The image reading apparatus according to claim 1, wherein said image pick-up element rows are arranged one another perpendicularly to said direction by a pitch which is integer times, not smaller than twice, as large as a height of one of said image pick-up elements.

5. The image reading apparatus according to claim 1, wherein said image pick-up element groups correspond respectively to red, green and blue.

6. The image reading apparatus according to claim 1, wherein said image pick-up element rows in each of said groups consist of first and second element rows, and said second element row is shifted by a pitch of almost half of the width of one of said image pick-up elements relative to said first element row.

7. The image reading apparatus according to claim 1, wherein each of said image pick-up element groups has a shield portion defining a plurality of opening portions, each smaller than a light receiving area of a respective image pick-up element, to shield light from reaching onto a peripheral portion of the image pick-up element.

8. The image reading apparatus according to claim 1, wherein said image pick-up element rows in all of said groups are disposed on a common substrate.

9. A method of correcting an undesired level difference between data on adjacent pixels, which may occur in association with the use of plural image pick-up element rows to read single-color intensity information on one pixel on a line with an image pick-up element contained in an image pick-up element row and single-color intensity information on an adjacent pixel in the same line with an image pick-up element contained in another image pick-up element row, said method comprising the steps of:
   receiving intensity information on pixels on at least one line;
   comparing intensity information $K_{n+1}$ on a $K_{n+1}$-th pixel on said one line with a first predetermined value to determine whether the intensity information $K_{n+1}$ have a value indicative of a level brighter as an image than a predetermined level;
   outputting the intensity information $K_{n+1}$ as data for the $K_{n+1}$-th pixel if the intensity information $K_{n+1}$ have the value indicative of the level;
   calculating an absolute value $|K_n-K_{n+1}|$ of a difference between the intensity information $K_{n+1}$ on the $K_{n+1}$-th pixel and intensity information $K_n$ on a K-th pixel on the same line as the $K_{n+1}$-th pixel is located;
   comparing the absolute value $|K_n-K_{n+1}|$ with a second predetermined value;
   outputting the intensity information $K_{n+1}$ as data for the $K_{n+1}$-th pixel if the intensity information $K_{n+1}$ do not have the value indicative of the level but the absolute value $|K_n-K_{n+1}|$ is larger than the second predetermined value; and
   outputting corrected information as data for the $K_{n+1}$-th pixel if the intensity information $K_{n+1}$ do not have the value indicative of the level and the absolute value $|K_n-K_{n+1}|$ is not larger than the second predetermined value.

10. The method according to claim 9, wherein said step of outputting corrected information includes calculating an average value based on the intensity information $K_{n+1}$ on the $K_{n+1}$-th pixel and the intensity information on the K-th pixel, and using the average value as the corrected information.

11. A system for correcting an undesired level difference between data on adjacent pixels, which may occur in association with the use of plural image pick-up element rows to read single-color intensity information on one pixel on a line with an image pick-up element contained in an image pick-up element row and single-color intensity information on an adjacent pixel in the same line with an image pick-up element contained in another image pick-up element row, said system comprising:
   a first circuit which receives intensity information on pixels on at least one line;
   a second circuit which compares intensity information $K_{n+1}$ on a $K_{n+1}$-th pixel on said one line with a first predetermined value to determine whether the intensity information $K_{n+1}$ have a value indicative of a level brighter as an image than a predetermined level;
   a third circuit which calculates an absolute value $|K_n-K_{n+1}|$ of a difference between the intensity information $K_{n+1}$ on the $K_{n+1}$-th pixel and intensity information $K_n$ on a K-th pixel on the same line as the $K_{n+1}$-th pixel is located; and
   a fourth circuit which compares the absolute value $|K_n-K_{n+1}|$ with a second predetermined value, and wherein:
      said first circuit is communicated with said second and fourth circuit; and
      said first circuit outputs the intensity information $K_{n+1}$ as data for the $K_{n+1}$-th pixel if the intensity information $K_{n+1}$ have the value indicative of the level, outputs the intensity information $K_{n+1}$ as data for the $K_{n+1}$-th pixel if the intensity information $K_{n+1}$ do not have the value indicative of the level but the absolute value $|K_n-K_{n+1}|$ is larger than the second predetermined value, and outputs corrected information as data for the $K_{n+1}$-th pixel if the intensity information Kn+1 do not have the value indicative of the level and the absolute value |Kn−Kn+1| is not larger than the second predetermined value.

12. The system according to claim 11, further comprising:
a fifth circuit that is communicated with said first circuit and that calculates an average value based on the intensity information Kn+1 on the Kn+1-th pixel and the intensity information on the K-th pixel, and
wherein said first circuit uses the average value as the corrected information.

13. A memory medium storing therein a program for executing a method of correcting an undesired level difference between data on adjacent pixels, which may occur in association with the use of plural image pick-up element rows to read single-color intensity information on one pixel on a line with an image pick-up element contained in an image pick-up element row and single-color intensity information on an adjacent pixel, in the same line with an image pick-up element contained in another image pick-up element row, said method comprising the steps of:

receiving intensity information on pixels on at least one line;

comparing intensity information Kn+1 on a Kn+1-th pixel on said one line with a first predetermined value to determine whether the intensity information Kn+1 have a value indicative of a level brighter as an image than a predetermined level;

outputting the intensity information Kn+1 as data for the Kn+1-th pixel if the intensity information Kn+1 have the value indicative of the level;

calculating an absolute value |Kn−Kn+1| of a difference between the intensity information Kn+1 on the Kn+1-th pixel and intensity information Kn on a K-th pixel on the same line as the Kn+1-th pixel is located;

comparing the absolute value |Kn−Kn+1| with a second predetermined value;

outputting the intensity information Kn+1 as data for the Kn+1-th pixel if the intensity information Kn+1 do not have the value indicative of the level but the absolute value |Kn−Kn+1| is larger than the second predetermined value; and outputting corrected information as data for the Kn+1-th pixel if the intensity information Kn+1 do not have the value indicative of the level and the absolute value |Kn−Kn+1| is not larger than the second predetermined value.

14. The memory medium according to claim 13, wherein said step of outputting corrected information includes calculating an average value based on the intensity information Kn+1 on the Kn+1-th pixel and the intensity information on the K-th pixel, and using the average value as the corrected information.

* * * * *